Patented Jan. 1, 1952

2,580,550

UNITED STATES PATENT OFFICE 2,580,550

BIS(p-CHLOROPHENYL)MERCAPTOLE ACETONE AND ITS MITICIDAL ACTIVITY

Arthur G. Jelinek, Wilmington, Del., assignor to E. I. du Pont de Nemours and Company, Wilmington, Del., a corporation of Delaware No Drawing. Application August 25, 1949,
Serial No. 112,417

4 Claims. (Cl. 167—30)

This invention relates to the compound bis(p-chlorophenyl) mercaptole acetone and to miticidal or mite killing compositions and methods employing the compound.

Bis(p-chlorophenyl) mercaptole acetone is represented by the formula

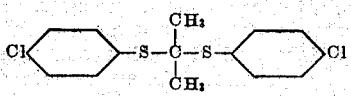

The compound is a white solid having a melting point of 51±0.5° C. It is soluble in acetone and in chloroform and is insoluble in water. It is stable to alkali but is decomposed slowly by dilute acid.

Bis(p-chlorophenyl) mercaptole acetone is prepared by the acid catalyzed (e. g. hydrogen chloride) reaction of p-chlorothiophenol and acetone in substantially stoichiometric proportions (2:1) preferably in the presence of a solvent such as chloroform.

The compound of the invention, bis(p-chlorophenyl) mercaptole acetone, has unusual miticidal properties. Applications of the compound kill not only the adult mites but also their eggs. Applications of the compound exhibit considerable residual action.

The compound of the invention in admixture with the conventional insecticidal adjuvants may be applied safely to growing crops and is particularly useful in the treatment of fruit orchards. The compound has the additional advantage of being compatible with sulfur and other fungicides and insecticides which are commonly used in the treatment of fruit trees.

Miticidal compositions of the invention are prepared by admixing bis(p-chlorophenyl) mercaptole acetone with suitable insecticidal adjuvants to provide formulations in the form of solutions, dust compositions, water-dispersible powders, aqueous dispersions or emulsions.

The term "insecticidal adjuvant" used herein refers to a substance which is capable of presenting or aiding in the presentation of a toxicant to insects, mites and similar pests. The term "adjuvant" is well established in the art where it is recognized that an active agent or toxicant is in itself of little practical utility for combatting insects and like pests unless it be presented in a form suitable for effecting intimate contact of the agent or its vapors, as the particular case may require, with the pest. Thus additional material or materials are employed in the formulation of an active agent to yield suitable insecticidal or miticidal compositions, such materials being called adjuvants.

Adjuvants such as the dusts, solvents, and wetting, dispersing and emulsifying agents set out in U. S. Patent 2,426,417 are suitably employed in the preparation of the miticidal compositions of the present invention.

In preparing the compositions of the invention, bis(p-chlorophenyl) mercaptole acetone is preferably admixed with a surface active agent of the type used to impart dispersibility to an organic liquid composition or powder in water.

Where a water-dispersible organic liquid composition containing bis(p-chlorophenyl) mercaptole acetone is desired, the dispersing agent used is preferably one that is soluble in the organic liquid. Typical of such oil-soluble dispersing agents, or emulsifying agents as they are sometimes called, are the amine salts of oleic acid, the sulfonated animal and vegetable oils such as sulfonated fish and castor oils, sulfonated petroleum oils, glycerol monostearate, sorbitan tristearate, diglycol oleate, diethylene glycol laurate, pentaerythritol monostearate, phthalic glycerol alkyd resins, and polyethylene oxides.

In the preparation of water-dispersible powdered compositions of the invention, the oil-soluble dispersing agents of the type illustrated above may be used and other dispersing agents which are not generally thought of as oil-soluble may also be employed. Examples of the latter are the polyvinyl alcohols, the sodium salts of sulfonated condensation products of naphthalene and formaldehyde, and the calcium or sodium salts of lignin sulfonic acid such as goulac.

Various other dispersing agents are listed in detail in U. S. Dept. of Agriculture Bulletin E-607 and in an article by McCutcheon in Chemical Industries, November 1947, page 811, entitled "Synthetic detergents."

The amount of dispersing agent used in the compositions of the invention will vary with the dispersing properties of the particular adjuvant used and will be varied too with the particular use for which the composition is intended; the dispersing agent is present in amount effective for imparting water-dispersibility to the composition. Generally the dispersing agent will not comprise more than about 10% by weight of the composition and with the better adjuvant materials, the percentage will be 3% or less.

The miticidal compositions of the invention consisting of bis(p-chlorophenyl) mercaptole acetone in admixture with a dispersing agent may be used as such in the preparation of aqueous spray compositions or, alternatively, they may be diluted with solvents to give solutions and water-dispersible liquids, or they may be diluted with finely-divided inert powders to give dusts and water-dispersible powders.

It is preferred, according to this invention, to prepare miticidal concentrates, that is, solutions or dusts containing the toxicant in high concentration. The concentrates are then dispersed or diluted before actual application. Such dispersion or dilution is obtained by mixing the compositions with additional amounts of diluent, solvents or dusts, or more preferably by dispersing the compositions in water to give aqueous emulsions or suspensions which are readily applied by means of conventional insecticidal spray equipment.

In preparing the water-dispersible dust compositions of the invention, the finely-divided inert powder used as a diluent is preferably selected from the class consisting of talcs, pyrophylite, natural clays, and diatomaceous earths. Other powdered inert diluents which may be used in the dust compositions include powders such as calcium phosphate, calcium carbonate, magnesium carbonate, sulfur, lime, and flours such as walnut shell, wheat, redwood, soya bean, and cottonseed.

Various solvents may be used if it is desired to prepare solutions containing bis(p-chlorophenyl) mercaptole acetone and a dispersing agent. Typical solvents are kerosene, trichloroethylene, tetrachloroethylene, alkylated naphthalene, xylene, toluene, cyclohexanone, and acetone. One should be careful, however, in the selection of a solvent and diluent if it is desired to apply a solution to growing crops since many of the common solvents tend to damage plants.

The concentration of bis(p-chlorophenyl)-mercaptole acetone in the miticidal concentrates may be varied widely. For example, compositions in the form of dusts or water-dispersible powders can be prepared containing from 10 to about 50% of the toxicant. The maximum obtainable concentrations employed in the preparation of liquid concentrates will, of course, vary widely according to the solubility of bis(p-chlorophenyl) mercaptole acetone in the particular solvent selected.

In actual application of the miticidal compositions of the invention to vegetation or to agricultural crops, it is preferred to dilute the concentrates, preferably by dispersion in water, to obtain aqueous suspensions or emulsions. The toxicant is then applied in the form of a spray containing from about 0.01 to 0.1% by weight of bis(p-chlorophenyl) mercaptole acetone.

In applying bis(p-chlorophenyl) mercaptole acetone for the control of mites and their eggs, the miticidal compositions are applied directly on the area or locus which is to be protected from mite infestation in amount sufficient to exert a miticidal action. It is not necessary that the compositions be applied directly to the mites, since the compositions have considerable residual effect and may be applied in advance of a possible mite infestation.

While the miticidal compositions of the invention include bis(p-chlorophenyl) mercaptole acetone as an essential active ingredient in admixture with a dispersing agent, they may also include fungicides such as sulfur, zinc dimethyldithiocarbamate, zinc ethylene bisdithiocarbamate, and manganese ethylene bis-dithiocarbamate; insecticides such as DDT, 2,2-bis(p-methoxyphenyl)-1,1,1-trichloroethane (methoxychlor), and 1,2,4,5,6,7,8,8-octachloro-4,7-methane-3a,4,7,7a-tetrahydroindane (chlordane); and other insect toxicants, bactericides and fungicides such as those set out in U. S. Patent 2,426,417.

The invention is illustrated by the following examples:

*Example I*

Dry hydrogen chloride was slowly bubbled into a mixture of 31.8 parts by weight of 4-chlorothiophenol and 5.8 parts by weight of acetone in 7.5 parts by weight of chloroform. Cooling was supplied to the reacting mass as required to keep the mass at slightly above room temperature. After about 30 minutes the reaction appeared to be completed and gasing was discontinued.

The reaction mass was allowed to stand overnight. The product was then extracted with ether. The ether extract was washed with 5% caustic solution and then with water. Following these washings the ether layer was dried above sodium sulfate and the ether subsequently removed by evaporation. There remained, following evaporation of ether, 27.4 parts by weight of molten bis(p-chlorophenyl) mercaptole acetone which quickly solidified to a white solid. M. P. 50.5–51.5° C. Analysis: Found, Cl 21.5; S 19.4; Theory, Cl 21.5; S 19.4.

*Example II*

The following is an example of a dust and water-dispersible powder composition of the invention. It is prepared by mixing the ingredients tabulated below in the indicated proportions by weight to obtain a finely-divided solid:

10% bis(p-chlorophenyl) mercaptole acetone
85% fuller's earth (average particle size less than 40 microns)
5% Goulac The powdered composition of this example is suitably applied as a dust. Still more preferably it is dispersed in water to form an aqueous suspension for application as a spray for the control of mites and their eggs.

*Example III*

A solution or water-dispersible liquid composition of the invention consists of the compound of the invention and a dispersing agent dissolved in an alkylated naphthalene solvent in the following proportions by weight:

25% bis(p-chlorophenyl) mercaptole acetone
73% summer spray oil
2% diethyl cyclohexylamine dodecyl sulfate The above solution is readily dispersible in water. A spray composition well suited for the control of mites is obtained by dispersing one pint of the above solution in 100 gallons of water.

I claim:
1. Bis(p-chlorophenyl) mercaptole acetone.
2. A miticidal composition comprising bis(p-chlorophenyl) mercaptole acetone as an essential active ingredient in admixture with a dispersing agent present in amount effective for imparting water-dispersibility to the composition.

3. The process of controlling mites on living plants which comprises applying to said plants an aqueous dispersion containing bis(p-chlorophenyl) mercaptole acetone as an essential active ingredient.

4. The process of controlling mites on living plants which comprises applying to said plants an aqueous dispersion containing from about 0.01 to 0.1% by weight of bis(p-chlorophenyl) mercaptole acetone.

ARTHUR G. JELINEK.

REFERENCES CITED

The following references are of record in the file of this patent:

UNITED STATES PATENTS

| Number | Name | Date |
|---|---|---|
| 2,291,528 | Bruson et al. | July 28, 1942 |

OTHER REFERENCES

Baumann: Berichte, vol. 18, pp. 887 and 882 (1885).

Campbell et al.: J. Econ. Ent., vol 27, December 1934, pp. 1176–1185 (see p. 1180, comp. No. 1118).